INVENTOR.
WILLIAM F. WATSON

Jan. 7, 1964  W. F. WATSON  3,117,312
VERTICAL SCALE CONDITION INDICATOR
Filed Nov. 7, 1960  6 Sheets-Sheet 2

INVENTOR.
WILLIAM F. WATSON
BY *Herbert L. Davis*

ATTORNEY

Jan. 7, 1964 W. F. WATSON 3,117,312
VERTICAL SCALE CONDITION INDICATOR
Filed Nov. 7, 1960 6 Sheets-Sheet 6

INVENTOR.
WILLIAM F. WATSON
BY *Herbert L. Davis*
ATTORNEY

United States Patent Office 3,117,312
Patented Jan. 7, 1964

3,117,312
VERTICAL SCALE CONDITION INDICATOR
William F. Watson, Fair Lawn, N.J., assignor to The Bendix Corporation, Teterboro, N.J., a corporation of Delaware
Filed Nov. 7, 1960, Ser. No. 67,843
13 Claims. (Cl. 340—316)

This invention relates to a vertical scale condition indicator and more particularly to an indicator device such as an altitude or ground speed indicator mechanism wherein a moving tape passing behind a lubber line or stationary indicator mounted in a bezel window opening presents to the viewer an indication of the sensed condition or ambient altitude or ground speed at which an aircraft is flying or hovering so that in conjunction with a command marker and a command counter, it is possible for the observer to determine from the command marker position whether at any given instant the operating condition of the aircraft is that indicated by the command counter.

An object of the invention is to provide a condition indicator mechanism in which the command marker moves in synchronization with the tape through the bezel opening, and is so arranged that when the condition indicated by the command counter has been attained, the command marker, lubber line and condition graduations on the tape will all be in line with each other.

Another object of the invention is to provide a novel means whereby a relatively large length of tape can be used as the indicating medium, resulting in an indicator wherein the tape condition indicator calibrations may be nonlinearized, so as to provide relatively large increments of tape for those conditions where extreme accuracy of reading is required and including novel means of tape tension and storage control.

In previous vertical scale instruments, it has been either necessary to resort to a closed loop tape system, with the resulting small scale factor making for reading difficulties with small condition indicator values or the use of an open loop in an attempt to increase the scale factor to a point where small indicator increments were readily discernible. In the use of the open loop arrangement, complications would arise due to the necessity of storing the tape and maintaining the required tape tension necessary for a smooth and accurate presentation at the bezel window opening, whereupon complicated clutching arrangements became necessary to insure the required tape tension and to facilitate the winding of the tape on the storage spools.

In those prior mechanisms where springs were employed to provide the torque necessary for storage spool wind up, there has been encountered a constantly fluctuating tape tension, resulting in readings of low accuracy and precision.

An object of the invention, therefore, is to provide a simple, economical, and at the same time superior configuration for accomplishing tape tension control and wind-up, whereby the indicator tape may be calibrated to any function, linear or nonlinear, and at the same time insure synchronization of the command marker, counter, and indicator tape over the entire altitude range.

Another object of the invention is to provide a novel vertical scale condition indicator for use in an aircraft wherein a tape passes behind a window opening to present to the viewer an indication of the prevailing condition such as altitude or ground speed at which the aircraft is flying, together with a second tape carrying a command marker adjustably positioned relative thereto and operated by an intermittent mechanism driven by a servo motor which in turn drives a condition command counter. The arrangement is such that upon the aircraft approaching a command condition, the command marker will be adjusted by a servo motor controlled by the prevailing condition, together with the condition indicator tape so as to bring the indicator command altitude and the command marker into coincidence with a fixed indicator or lubber line upon the command condition being attained.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Referring to the drawings.

Figure 4:
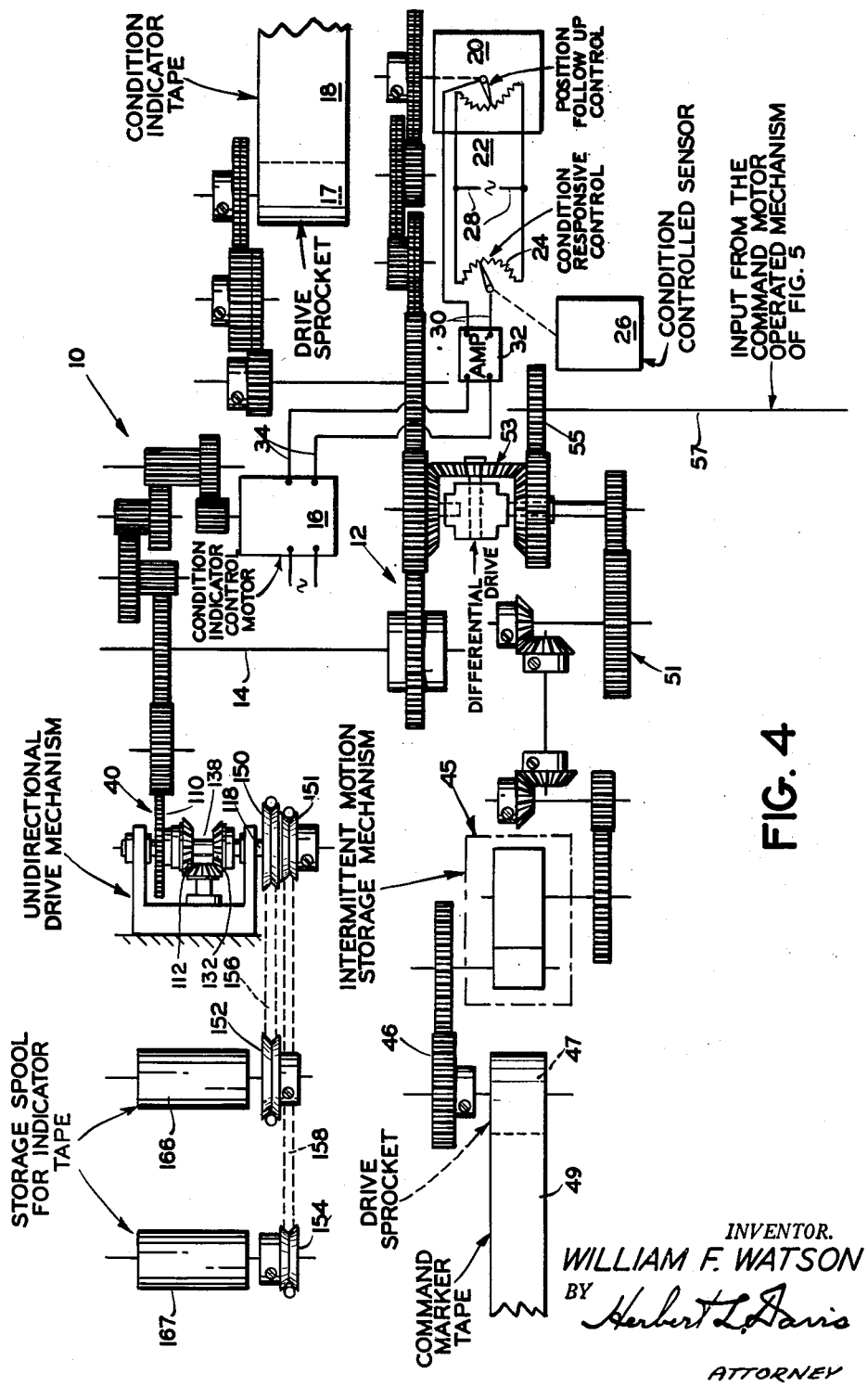
FIGURE 4 is a schematic showing of the gear train for operation of the indicator tape and command marker operating tape.

Referring to the schematic drawing of FIGURE 4, there is indicated generally by the numerals 10 and 12 parallel gear trains operatively connected by a shaft 14. A condition indicator control motor 16 may drive through gear train 10 a sprocket 17 for positioning a suitable condition indicator tape 18 and through shaft 14 the parallel gearing 12 to position a follow-up control arm of the potentiometer 20.

Figure 1:
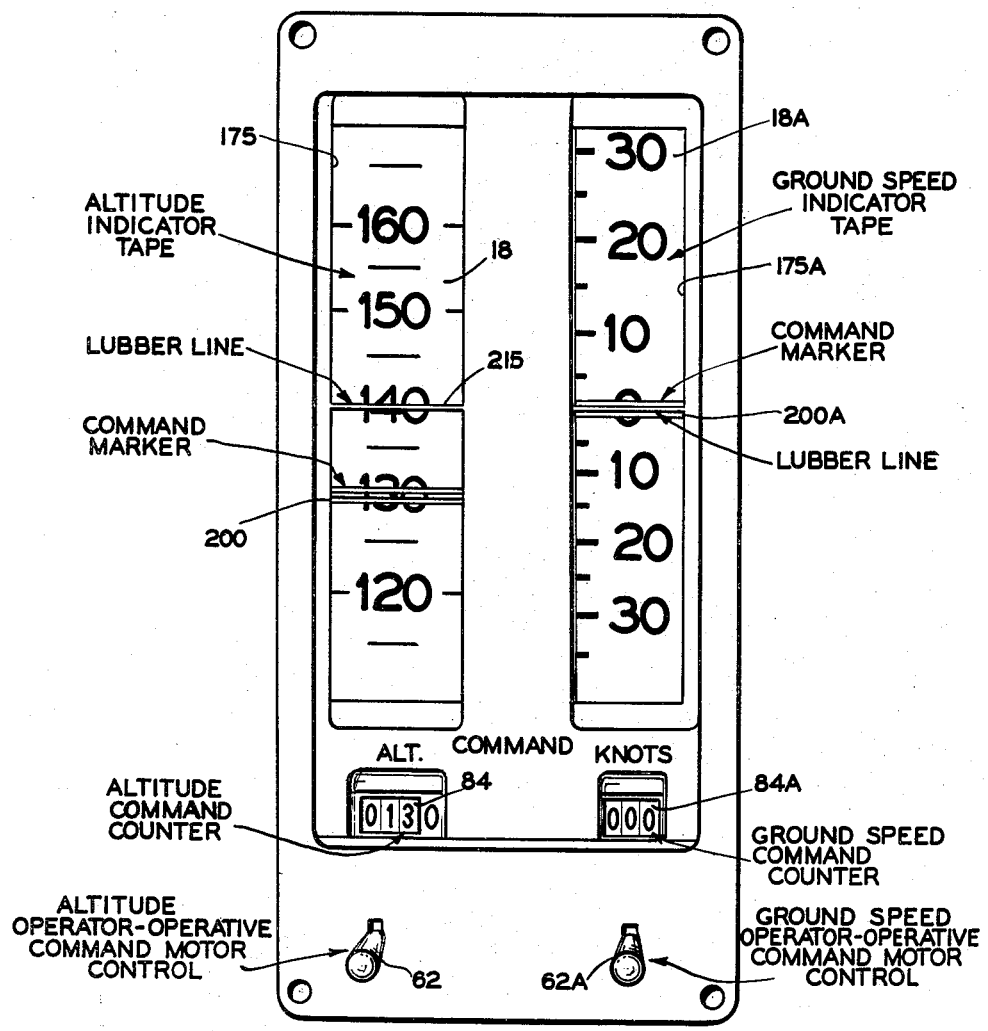
FIGURE 1 is a front plan view of the vertical scale indicator mechanism in assembled relation in a casing.

The potentiometer 20 may be suitably connected in an electrical bridge 22 including a second condition responsive control potentiometer 24 having an arm suitably positioned by a condition responsive sensor 26. The sensor 26 may be a radar controlled altitude sensor of conventional type effective to operate the potentiometer 24 and therethrough suitable means to cause adjustment of the indicator tape 18 so calibrated as to provide an indication of the prevailing altitude; or the condition controlled sensor may be a suitable ground speed sensor effective to operate suitable means to cause adjustment of an indicator tape 18A so calibrated as to provide an indication of the prevailing ground speed, as shown in FIGURE 1.

In the aforenoted arrangement, as shown in FIGURE 4, the adjustment of the control arm of the potentiometer 24 by the condition controlled sensor 26 is effective to electrically unbalance the bridge circuit 22 having electrical input lines 28 connected across a suitable source of alternating current so that upon the unbalancing of the bridge circuit 22 an electrical signal will be applied across output lines 30 leading to an amplifier 32. The amplified signal is in turn applied across output lines 34 leading from the amplifier 32 to the condition indicator control motor 16 so as to cause rotation of the motor 16 in a direction and at a speed dependent upon the sense and magnitude of the unbalanced relationship of the bridge 22. The motor 16 in turn drives through gearing 10, shaft 14 and parallel gearing 12 so as to position the control arm of the follow-up control potentiometer 20 in a sense to once again balance the bridge circuit 22.

The rotation of the motor 16 also drives through the gearing 10 the drive sprocket 17 for adjustably positioning the indicator tape 18 as well as a unidirectional drive mechanism 40, as hereinafter explained, and further through shaft 14 the parallel gear train 12 and an intermittent motion storage mechanism 45 which may be of a conventional type or of a type such as described and claimed in greater detail in U.S. Patent No. 2,938,031, granted June 17, 1958, to Charles E. Gregory and assigned to Bendix Aviation Corporation, now The Bendix Corporation.

The rotation of the intermittent motion storage mechanism 45 in turn may drive through a gearing 46 a sprocket 47 for positioning a command marker tape 49, as explained hereinafter in greater detail.

The input to the intermittent motion storage device 45 is in turn connected through gearing 51 and a differential drive mechanism 53 to the gear train 12. Further, adjustably positioning the differential drive 53 through a control gearing 55 is a shaft 57 providing an input from the command motor operative mechanism of FIGURE 5.

Figure 5:
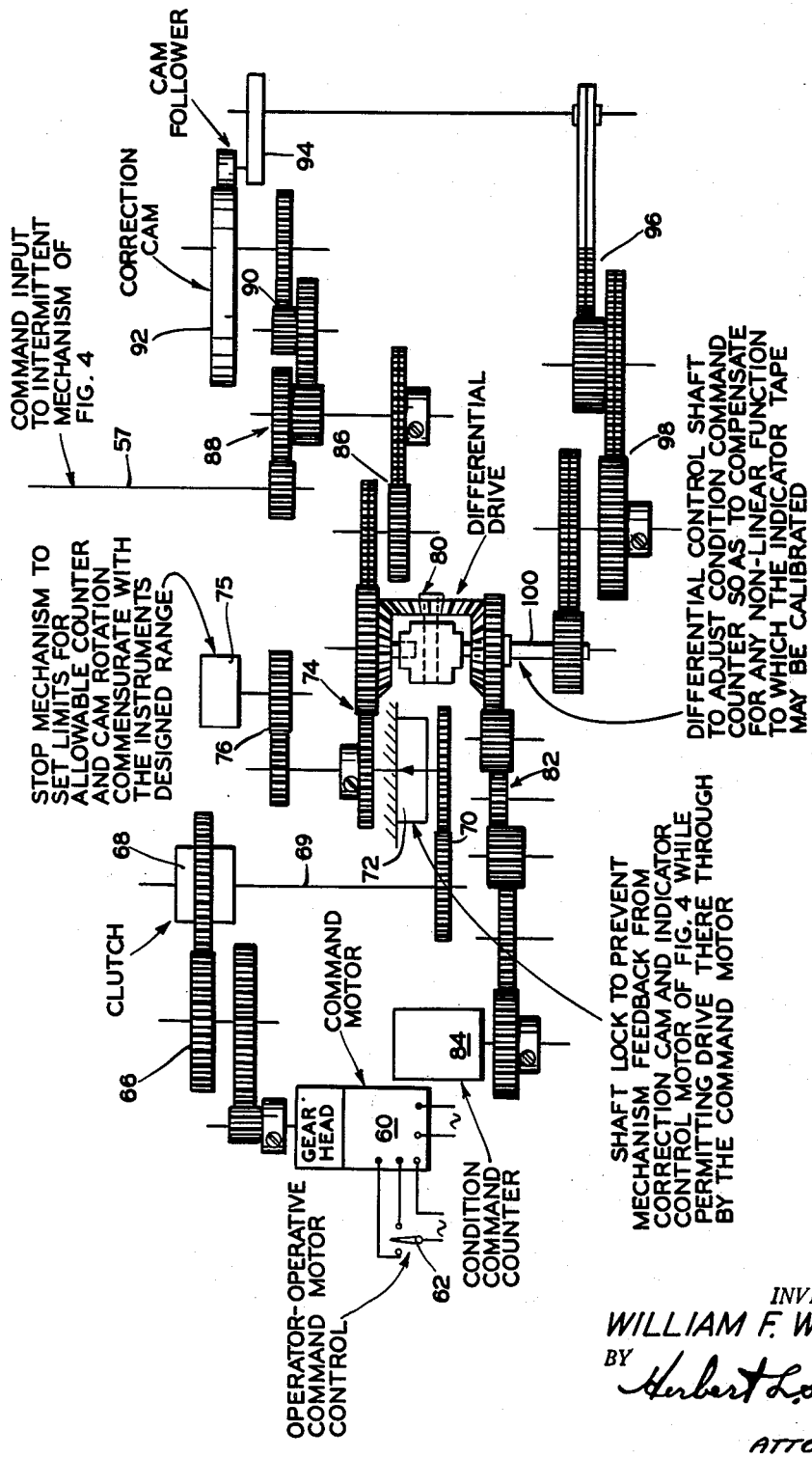
FIGURE 5 is a schematic showing of the gear train for operation of the command counter including a driving connection therefrom to that part of the gear train of FIGURE 4 for positioning the command marker operating tape through an intermittent motion storage device.

Referring now to the schematic drawing of FIGURE 5, there is indicated by the numeral 60 a command motor controlled by an operator-operative toggle switch 62, shown schematically in FIGURE 5 and in FIGURE 1 as mounted on the bezel face of the indicator instrument.

The operator-operative command motor control 62 is shown in FIGURE 5 in a neutral position and may be manually adjusted to selectively close one or the other of a pair of control contacts to operatively connect a suitable source of alternating current to control windings of the motor 60 so as to cause rotation thereof in one direction or the other as selectively determined through the operation of the toggle switch 62. Rotation of the command motor 60 is affective to drive through gearing 66, clutch 68, shaft 69 and gearing 70 a shaft lock 72 and through the shaft lock 72 an operating gearing 74 leading to the input shaft 57 for the intermittent mechanism 45 of FIGURE 4. A suitable stop mechanism 75 may be driven through the shaft lock 72 and gearing 76 and so arranged as to limit the range of operation of the command motor 60 to within a predetermined limited operating range.

The shaft lock 72 may be a suitable one-way coupling of a conventional type such as described in U.S. Patent No. 2,449,020, granted September 7, 1948, to Louis Spraragen, and so arranged as to lock the gearing 74 from feedback motion being imparted thereto by attendant interconnected mechanism, while permitting motor 60 to drive the gearing 74 through the shaft lock 72. The rotation imparted to the gearing 74 by the command motor 60 through the shaft lock 72 is transmitted by gearing 74 to a differential drive mechanism 80 and thereby to gearing 82 to position a condition command counter 84, of a conventional type, so arranged as to expose to the view of the operator, as shown in FIGURE 1, suitable numerals for indicating a command condition such as altitude.

A path parallel to that leading to the input to the differential drive mechanism 80 leads from the gearing 74 to the gearing 86 so that rotation imparted by the command motor 60 is transmitted to the gearing 86 as well as to the input to the differential drive 80. The rotation imparted to the gearing 86 by motor 60 is in turn transmitted to gearing 88 and there again divided so as to pass in turn through the shaft 57 and then, as shown in FIGURE 4, through the control gearing 55, differential drive 53 and gearing 51 to the input of the intermittent drive 45 and such rotation imparted to gearing 88 is also applied, as shown in FIGURE 5, through gearing 90 so as to position a correction cam 92 and thereby a cam follower 94 cooperating therewith. The positioning of the cam follower 94 in turn positions a sector 96 and gearing 98 to in turn displace a control shaft 100 of the differential drive mechanism 80. The displacement of the control shaft 100, dependent upon the sense or displacement of the correction cam 92, will result in either adding to or subtracting from the adjustment imparted to the command counter 84 by the motor 60 so as to compensate for any nonlinear function to which the indicator tape 18 may be calibrated and thereby position the condition command counter 84 in synchronism therewith, as will be explained in greater detail hereinafter.

*Unidirectional Drive Mechanism*

Figure 6:
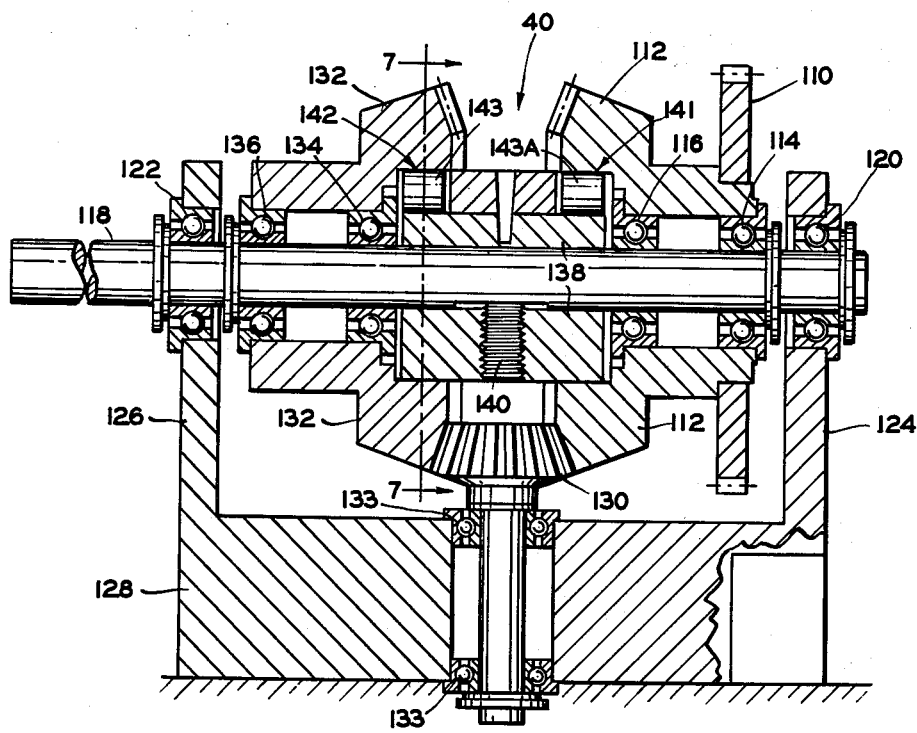
FIGURE 6 is an enlarged sectional view of a unidirectional drive embodied in the invention.
Figure 7:
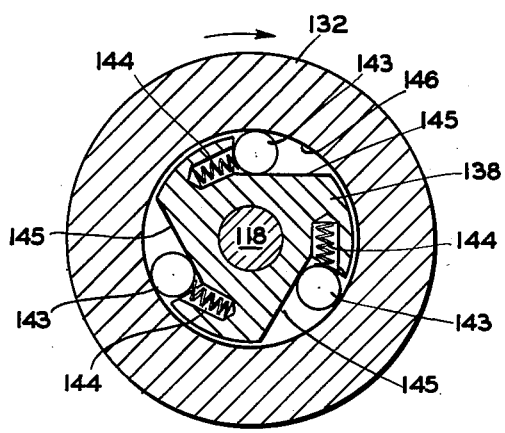
FIGURE 7 is a sectional view of FIGURE 6 taken along the lines 7—7 thereof and illustrating the structure of one of the free wheeling clutches embodied therein.

The unidirectional drive mechanism 40, heretofore referred to with reference to the gearing 10 of FIGURE 4, has been shown in greater detail in FIGURES 6 and 7. As shown in FIGURE 6, the unidirectional drive mechanism includes an input gear 110 driven by gearing 10, as shown in FIGURE 4 and drivingly connected to a bevel gear 112 rotatably mounted on bearings 114 and 116 carried by a drive shaft 118 rotatably mounted in turn on bearings 120 and 122 carried by arms 124 and 126 projecting from a fixed base member 128.

Further, in toothed engagement with the bevel gear 112 is a spur gear 130 which in turn is arranged in toothed engagement with a second bevel gear 132, similar to the gear 112. The spur gear 130 is rotatable on bearings 133 mounted in the base member 128 while the bevel gear 132 is rotatably mounted on the driven shaft 118 by bearings 134 and 136. The bevel gear 132 is thus so arranged as to be driven by the spur gear 130 in an opposite rotary direction from that of the bevel gear 112 in driving the spur gear 130.

Further, there is arranged in a position intermediate the bevel gears 112 and 132 a coupling member 138 affixed by a pin 140 to the shaft 118. The coupling member 138 includes unidirectional or free wheeling clutch devices 141 and 142 cooperating therewith, both of which devices may be of the spring pressed roller type shown in FIGURE 7.

The free wheeling clutch device 142, shown in FIGURE 7, includes a plurality of rollers 143 biased by spring elements 144 so as to move into wedging relation between an inclined surface 145 formed in the coupling member 138 and an internal surface 146 of the bevel gear 132 upon rotation of the gear 132 in a clockwise direction, as viewed in FIGURE 7. Such action in turn serves to drivingly connect the gear 132 through the device 142 and member 138 to the shaft 118. The rollers 143, however, are arranged so as to permit the bevel gear 132 to rotate freely on the shaft 118 upon rotation of the gear 132 in a counterclockwise direction, as viewed in FIGURE 7.

The free wheeling clutch device 141 has a similar construction to that of the device 142 and the arrangement is such that upon rotation of the input gear 110 in such a clockwise direction similar wedging rollers 143A of the clutch device 141 drivingly connect the bevel gear 112 through the coupling member 138 to the shaft 118, while upon rotation of the input gear 110 in an opposite counterclockwise direction the wedging rollers 143A permit the gear 112 to rotate freely on the shaft 118. However, such free rotation of the input gear 110 in said opposite counterclockwise direction causes the bevel gear 112 to effect rotation of the spur gear 130 in a sense to drive the bevel gear 132 in an opposite clockwise direction, as viewed in FIGURE 7, so as to cause the rollers 143 in the mechanism 142 to lock between the gear 132 and the coupling member 138 and thereby drivingly connect the gear 132 through the coupling member 138 to the shaft 118.

The aforenoted arrangement is such that the rotation imparted to the shaft 118 will be in the same direction irrespective of whether it is driven by the bevel gear 112 through the mechanism 141 or by the bevel gear 132 through the mechanism 142. Thus, regardless of the direction of rotation imparted to the input gear 110, the direction of rotation of the driven output shaft 118 will be in the same direction, i.e., the clockwise direction, as viewed in FIGURE 7. The shaft 118 is drivingly connected to storage pulleys 150 and 152, as shown in FIGURES 3 and 4 and explained hereinafter.

*Storage Spool Arrangement for Indicator Tape*

Figure 2:
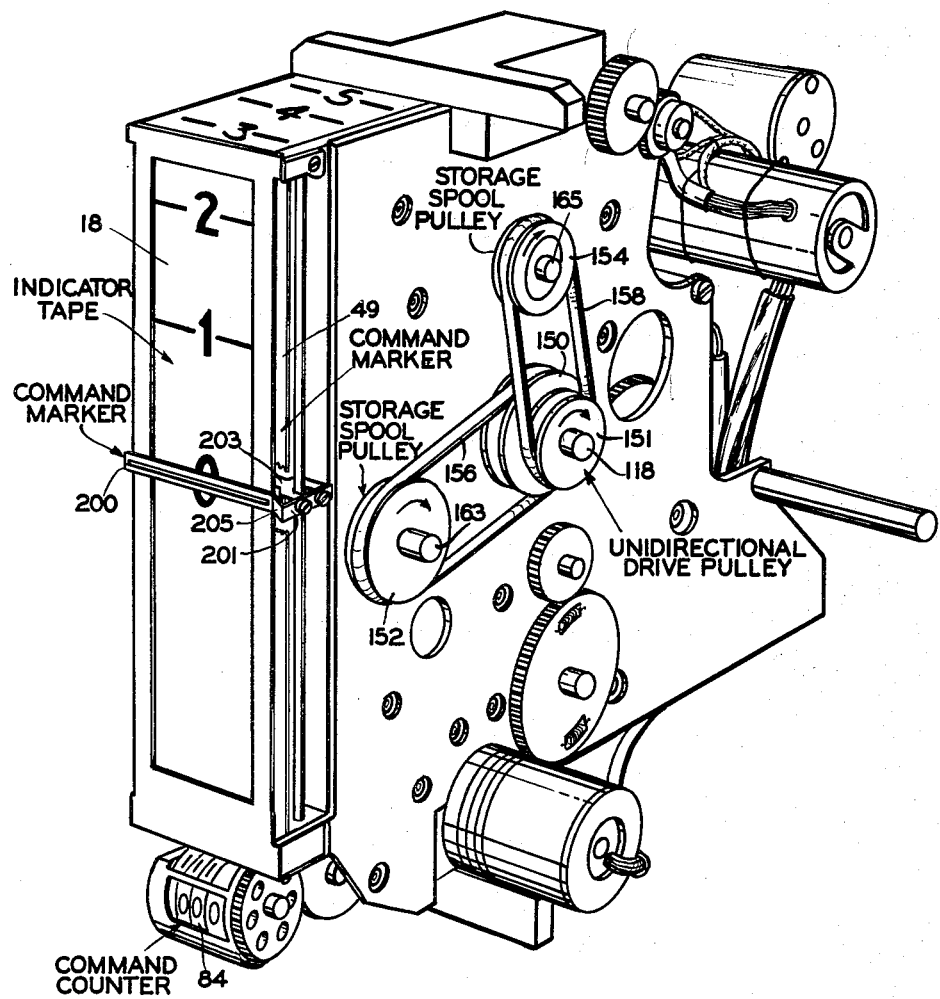
FIGURE 2 is a perspective view of the vertical scale indicator mechanism shown removed from the casing.
Figure 3:
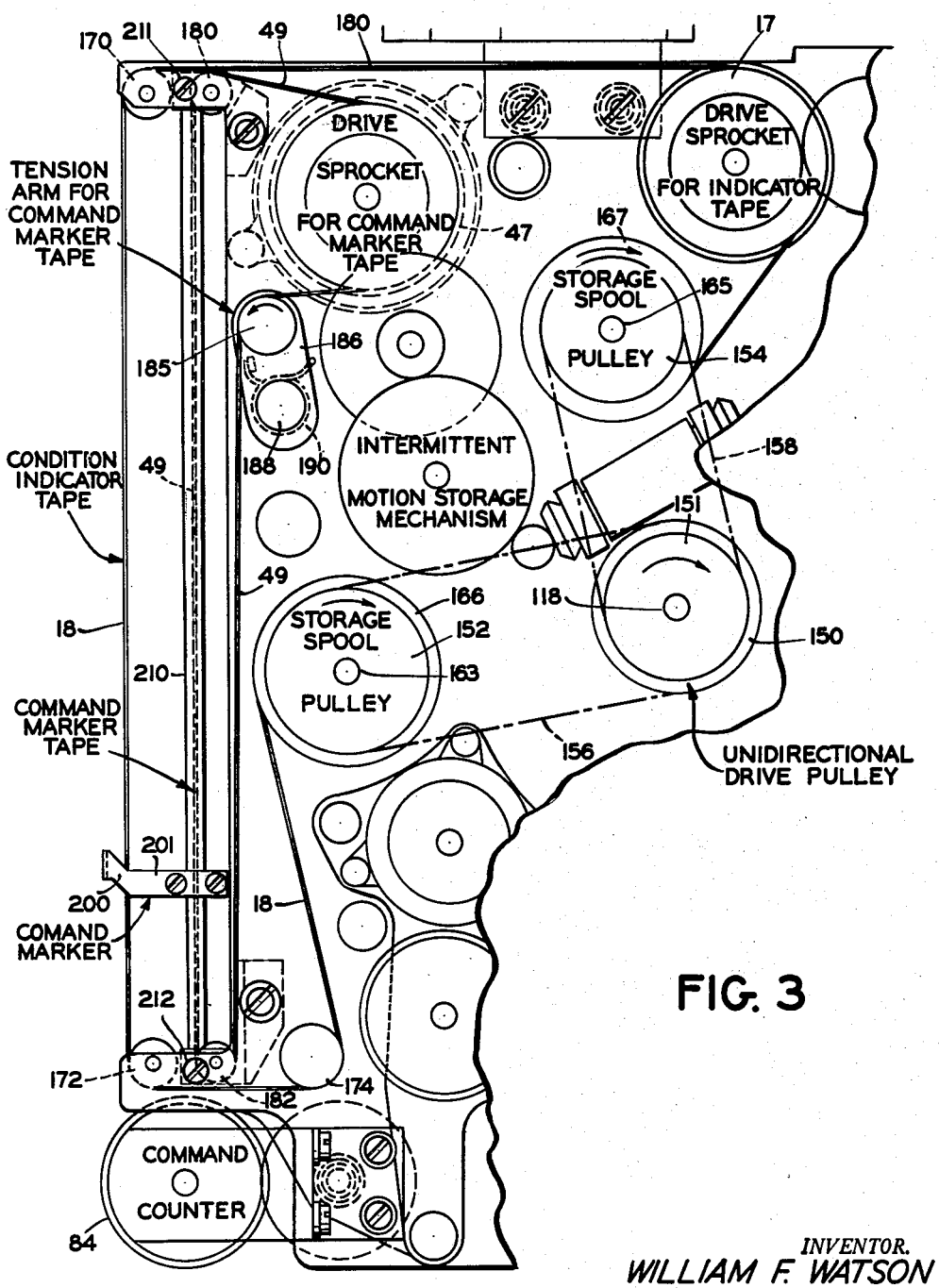
FIGURE 3 is a fragmentary side view of the vertical scale indicator mechanism showing the indicator tape, command marker operating tape with cooperating driving sprockets for the indicator tape and command marker operating tape together with storage spools for the indicator tape.

As shown in FIGURE 3, the direction of rotation imparted by the unidirectional drive 40 to the output shaft 118 will be in a direction causing double V-groove nylon pulleys 150 and 151 affixed thereto to be rotated in a clockwise direction. The pulleys 150 and 151 are in turn drivingly connected to V-groove nylon pulleys 152 and 154 respectively, as shown in FIGURES 2 and 3, by elastic spring coupling bands 156 and 158 respectively. Thus, the clockwise rotation imparted by the unidirectional drive to the pulleys 150 and 151 will impart a corresponding clockwise rotation to the respective storage spool pulleys 152 and 154. As shown in FIGURE 3, these storage spool pulleys 152 and 154 are in turn drivingly connected by shafts 163 and 165 to suitable storage spools 166 and 167, respectively, carrying the condition indicator tape 18 which is in turn adjustably positioned by the drive sprocket 17.

The indicator tape 18 passes from storage spool 167 over drive sprocket 17 to guide pulleys 170 and 172 positioned at the upper and lower ends of a viewing window 175 in the panel of the indicator instrument and over a third pulley 174 to the storage spool 166. The arrangement is such that the storage spools 166 and 167 are both biased in a clockwise direction tending to pull the condition indicator tape 18 taut in opposite senses relative one to the other so as to prevent any slack therein. In the normal adjusted position then the spring driving connections 156 and 158 tend to slip during operation of the unidirectional drive pulleys 150 and 151 with one tending to slip to a greater extent than the other dependent upon the direction of drive of the sprocket 17 in adjustably positioning the indicator tape 18.

*Command Marker Tape Arrangement*

The command marker tape 49 is of a continuous loop type and is shown in FIGURE 3 driven by sprocket 47 over a pulley 180 positioned in the instrument casing immediately behind the pulley 170 and then over a second pulley 182 positioned in the instrument casing immediately behind the pulley 172. A third pulley 185 as carried by an arm 186 pivotally mounted on a pin 188 and biased by a spring 190 in a counterclockwise direction so that the pulley 185 cooperates with the tape 49 so as to hold the tape 49 taut under the tension of the force exerted by the spring 190.

Affixed to the marker tape 49, as best shown in FIGURE 2, is a command marker 200 projecting in front of the indicator tape 18 and having rearwardly extending arms 201 at the opposite ends thereof between which is secured a member 203 suitably fastened by pins to the command marker tape 49. The member 203 has bifurcated end portions 205 slidably mounted at opposite sides of a bar 210 affixed at opposite ends 211 and 212 in the casing of the instrument so that rotation of the command marker tape by the drive sprocket 47 will effect adjustment of the command marker 200 from one end of the viewing window 175 to the opposite end thereof relative to the indicator tape 18 adjustably positioned therein. A lubber line 215 extends across the reviewing window 175 in spaced relation to the indicator tape 18 so as to permit the command marker 200 to pass between the lubber line 215 and the indicator tape 18 in cooperative relation therewith in the positioning of the indicator tape 18 and marker tape 49, as heretofore explained.

*Operation*

For purposes of explanation of the operation of the invention, the indicator mechanism may be thought of as consisting of the two gear trains of FIGURES 4 and 5 linked by the common shaft 57. Because of the nonlinear calibration of the indicator tape 18 of FIGURE 4, the function of the gear train of FIGURE 5 is to produce nonlinear rotation of the command counter 84 in response to actuation of the altitude command switch 62.

The command information thus applied, passes into the gear train of FIGURE 4 through shaft 57 where it, depending upon the instantaneous position of the intermittent device 45, either rotates the command marker sprocket 47 or stores the command information, the commanded condition, such as altitude or ground speed, in the intermittent mechanism 45.

For a given command, when the appropriate section of the indicator tape 18 bearing, for example, the altitude graduation coinciding with that shown on the command counter first comes into view in the bezel window opening 175, the command marker 200 will align itself with this point on the indicator tape 18 and will move in synchronization with it during the period when it is visible in the bezel window opening 175. When the command marker 200, and the lubber line 215 are in alignment it indicates that the aircraft is flying or hovering at the altitude shown by the command counter 84. The position of the command marker 200 above or below the lubber line 215 is an indication that the aircraft is above or below the altitude indicated on the command counter 84, as shown by FIGURE 1.

While the above mentioned altitude information is being stored in the intermittent mechanism 45, rotation of the motor 60 passing through the differential drive 80 is attempting to displace the counter 84 in a linear fashion which would give rise to an incorrect reading due to the nonlinear calibration of the tape 18. This, however, is prevented by coincidentally turning the cam 92 and the follower arm 94, which, being geared to the differentials control shaft 100, as shown in FIGURE 5, either adds to or subtracts from the linear motion being fed into the counter 84, thus assuring the correct reading of the command counter 84. The curvature of the cam can be so generated as to compensate for any nonlinear function to which the indicator tape 18 may be calibrated.

The external source of the indicated condition, such as altitude, is a sensor containing a potentiometer 24, as shown by FIGURE 4, electrically similar to that of the potentiometer 20 of the indicator. These potentiometers are electrically connected in such a manner as to produce the bridge circuit 22. Signals, produced by rotation of the sensor potentiometer 24, create an electrical unbalance in the bridge circuit 22, which appears as a voltage across the input terminals of the amplifier 30. Passage of the signal voltage through the amplifier 30 raises it to a level which will produce rotation of the motor 16 in a direction and at a speed, determined by the phase and magnitude of the amplifier output. Gear train motion produced by drive motor 16 rotation will cause the indicator tape transport sprocket 17, the control arm of the follow up potentiometer 20, intermittent mechanism 45 and unidirectional drive 40 to be displaced to new angular positions. Angular displacement will continue until the control arm of the follow up potentiometer 20 is driven to a position where electrical balance of the bridge circuit 22 is restored, at which time the gear train 10 comes to rest.

Angular displacement of the sprocket 17 during the above sequence of operations will have transported the indicator tape 18 to a new position with respect to the lubber line 215, thus visually indicating the altitude or sensed condition change. Coincidentally, rotation of the input shaft to the unidirectional device 40 will cause one of its direction sensitive free wheeling clutches 141 or 142 to lock and drive its output shaft 118, in a direction tending to wind tape on storage spools 166 and 167. Orientation of the free wheeling clutch devices 141 and 142 has been so arranged as to provide slipping of one or the other of the clutch devices when the above sequence of operation takes place. Should the input gear 110 be rotated in the opposite direction by the motor 16 in response to an altitude or sensed condition signal of the opposite phase, the reverse of the above sequence takes place, with the output shaft 118 and pulleys 150 and 151 always rotating in the same direction, regardless of the phase of the altitude signal.

Output shaft torque is transmitted through double V-groove nylon pulleys 150 and 151 by means of the spring belts 156 and 158, to similar V-groove pulleys 152 and 154 on the storage spool shafts, making torque available for tape windup. Any tape made available by the tape transport sprocket 17 will be immediately wound on the storage spool which is on that side of the sprocket 17 where a reduction in tape tension is sensed by the spring belt 156 or 158.

With all available tape wound, the storage reel comes to a stop, though being constantly urged forward by the slipping action of the spring belt in the V-groove of the nylon pulley. The tape will now be stressed by this rotational force until a predetermined stress has been attained, after which the drive side of both spring belts 156 and 158 will be stretched until a value is reached where the pull of the spring exceeds the frictional force between the spring belt and the nylon pulley, after which slipping occurs. Slipping will continue until additional indicator tape 18 is made available by the sprocket 17 to either spool 166 or 167, at which time the winding cycle will repeat itself. The pull or the spring reached just prior to slipping provides the necessary torque on the storage spool shafts to maintain the indicator tape 18 at the predetermined tension required for optimum performance during those periods when the tape is in motion, when the altitude or indicated condition remains at a constant value, or those times when the indicator is not in use.

Pulley and tape storage spool diameters as well as the gearing linking it with the drive motor have been so selected as to make it possible for either storage spool to wind 1.5 times more tape than the sprocket 17 is capable of supplying under the most unfavorable conditions.

Such a critical condition would exist with the drive motor 16 turning in a direction so as to be just starting to wind tape on an empty storage spool, which would have a minimum diameter at this time and therefore capable of accepting only a minimum length of tape per revolution.

With the servo loop at rest, the introduction of the sensed condition or altitude signal will produce tape transport rotation of sprocket 17 which by virtue of sprocket teeth engagement in perforations along the tape edges, is a positive drive, and will overpower the storage spool 166 or 167 which has to supply the required tape, and transport the tape past the lubber line 215. The opposite spool 166 or 167 during the sequence is winding all tape made available to it. Winding will continue until the gear train 12 rotates the follow up potentiometer 20 to a position which again electrically balances the bridge circuit 22, at which time the gear train comes to rest with the indicator tape 18 under the predetermined tension.

For descriptive purposes, the winding of the indicator tape 18 made available by the tape transport sprocket 17 to a storage spool 166 or 167 and the means to secure the correct tape tension have been described as separated operations. However, under operational conditions these are for all practical purpose simultaneous functions, with the indicator tape 18 always presenting a taut appearance at the lubber line 215 and over the entire display opening 175 in the bezel window. Tape takeup is instantaneous and sensed condition or altitude signals of any magnitude, large or small, will result in no sagging or wrinkling of the indicator tape 18, nor is there any decrease of tape tension while holding a constant indicated condition or altitude or during non-operational periods with power to the drive motor 16 removed.

While the foregoing mechanism of FIGURES 2-7 has been described as applicable to the nonlinear indicator tape 18 of the altitude indicator of FIGURE 1, similar structure may be utilized to control the indicator mechanism of a nonlinear ground speed indicator tape 18A of FIGURE 1 in which corresponding parts have been indicated by like numerals to those heretofore explained with reference to the altitude indicator tape 18. Similarly, the invention may be applied to effectively indicate other sensed conditions in which the operation of a nonlinear condition indicator tape may be desired.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a condition indicator control system of a type including a condition indicator tape, drive means for adjustably positioning the indicator tape, a first storage spool operatively connected to the tape at one side of the drive means, a second storage spool operatively connected to the tape at the opposite side of the drive means, and condition responsive means to selectively control the direction of operation of said reversible motor means; the improvement comprising coupling means for operatively connecting said reversible motor means to said first and second storage spools, said coupling means including an input means, an output shaft, first and second unidirectional clutch means, each clutch means coupled to said output shaft and effective to drive said shaft in a same single direction, said input means driving said first clutch means, motion reversing means coupling said second clutch means to said input means, said coupling means thereby providing a unidirectional output motion to said shaft effective upon operation of said reversible motor means in either of said directions to bias said storage spools in a direction tending to wind the tape simultaneously on both of said storage spools so as to maintain the indicator tape under tension, and friction drive means for effecting a continuous operative connection between said reversible motor means and each of said storage spools, and said friction drive means being arranged to effectively slip so as to maintain the tension applied to said storage spools through said coupling means within a preset range while the reversible motor means adjustably positions the indicator tape in opposite directions through said drive means.

2. In a condition indicator control system of a type including a condition indicator tape, drive means for adjustably positioning the indicator tape, reversible motor means operatively connected to said drive means, and condition responsive means to selectively control the direction of rotation of said reversible motor means; the improvement comprising another tape, a command marker carried by said other tape and arranged in cooperative relation with indicia on said indicator tape, another drive means for adjustably positioning said other tape, a second reversible motor means, operator-operative means to selectively control the direction of rotation of said second motor means, differential drive means for jointly connecting said first and second mentioned motor means to said other drive means so as to jointly position said other tape and thereby the command marker.

3. The improvement defined by claim 2 including a command counter, means operatively connecting said second motor means to said command counter, and said last mentioned connecting means including shaft lock means to prevent said first mentioned motor means from driving said counter therethrough while drivingly coupling said second motor means to said counter through said last mentioned connecting means.

4. The improvement defined by claim 2 including an intermittent motion storage mechanism operatively connected between the differential drive means and the other drive means to limit the positioning of the other tape and thereby the command marker relative to the indicia on said indicator tape to within a predetermined limited range.

5. The improvement defined by claim 2 including a command counter, means operatively connecting said second motor means to said command counter, and said last mentioned connecting means including shaft lock means to prevent said first mentioned motor means from driving said counter therethrough while drivingly coupling said second motor means to said counter through said last mentioned connecting means; an intermittent motion storage mechanism operatively connected between the differential drive means and said other drive means to limit the positioning of the other tape and thereby the command marker relative to the indicia on said indicator tape to within a predetermined limited range.

6. The improvement defined by claim 2 including a command counter, means operatively connecting said second motor means to said command counter, and said last mentioned connecting means including shaft lock means to prevent said first mentioned motor means from driving said counter therethrough while drivingly coupling said second motor means to said counter through said last mentioned connecting means, said last mentioned connecting means including another differential drive means operatively connected between said shaft lock means and said counter, cam correction means adjustably positioned by said second motor means through said shaft lock means, and cam follower means adjustably positioned by said cam correction means and operatively connected to said other differential drive means to effectively adjust said counter so as to compensate the counter for nonlinearity in the calibration of the indicator tape.

7. The improvement defined by claim 2 including a command counter, means operatively connecting said second motor means to said command counter, and said last mentioned connecting means including shaft lock means to prevent said first mentioned motor means from driving said counter therethrough while drivingly coupling said second motor means to said counter through said last mentioned connecting means, said last mentioned connecting means including another differential drive means operatively connected between said shaft lock means and said counter, cam correction means adjustably positioned by said second motor means through said shaft lock means, cam follower means adjustably positioned by said cam correction means and operatively connected to said other differential drive means to effectively adjust said counter so as to compensate the counter for nonlinearity in the calibration of the indicator tape, and an intermittent motion storage mechanism operatively connected between the first mentioned differential drive means and said other drive means to limit the positioning of the other tape and thereby the command marker relative to the indicia on said indicator tape to within a predetermined limited range.

8. In a condition indicator control system of a type including a condition indicator tape, drive means for adjustably positioning the indicator tape, reversible motor means operatively connected to said drive means, and condition responsive means to selectively control the direction of rotation of said reversible motor means; the improvement comprising another tape, a command marker carried by said other tape and arranged in cooperative relation with indicia on said indicator tape, another drive means for adjustably positioning said other tape, a second reversible motor means, operator-operative means to selectively control the direction of rotation of said second motor means, differential drive means for jointly connecting said first and second mentioned motor means to said other drive means, said second motor means being controlled by said operator-operative means so as to adjustably position through said differential drive means the other tape and thereby the command marker relative to the indicia on said indicator tape, and the first mentioned motor means being controlled by said condition responsive means so as to adjustably position through said differential drive means the other tape and thereby the command marker in synchronism with the adjustment of the indicator tape effected through operation of the first mentioned drive means by said first mentioned motor means.

9. The improvement defined by claim 8 including a command counter, means operatively connecting said second motor means to said command counter, said last mentioned connecting means including shaft lock means to prevent said first mentioned motor means from driving said counter therethrough while drivingly coupling said second motor means to said counter through said last mentioned connecting means, said last mentioned connecting means including another differential drive means operatively connected between said shaft lock means and said counter, cam correction means adjustably positoned by said second motor means through said shaft lock means, cam follower means adjustably positioned by said cam correction means and operatively connected to said other differential drive means to effectively adjust said counter so as to compensate the counter for nonlinearity in the calibration of the indicator tape, and an intermittent motion storage mechanism operatively connected between the first mentioned differential drive means and said other drive means to limit the positioning of the other tape and thereby the command marker relative to the indicia on said indicator tape to within a predetermined limited range.

10. In a condition indicator control system of a type including a condition indicator tape, a drive sprocket for adjustably positioning the indicator tape, a first storage spool operatively connected to the tape at one side of the drive sprocket, a second storage spool operatively connected to the tape at the opposite side of the drive sprocket, reversible motor means operatively connected to said drive sprocket, and condition responsive means to selectively control the direction of rotation of said reversible motor means; the improvement comprising means operatively connecting said motor means to said first and second storage spools, said connecting means including a unidirectional drive effective upon rotation of said motor means to bias said storage spools in a direction tending to wind the storage tape simultaneously on both of said storage spools so as to maintain the indicator tape under tension, said connecting means including independent friction drive means for effecting a continuous driving connection between said unidirectional drive and each of said storage spools, said independent friction drive means being arranged to effectively slip so as to maintain the tension applied therethrough to said storage spools within a preset range while the motor means adjustably positions the indicator tape through operation of said drive sprocket, another tape, a command marker carried by said other tape and arranged in cooperative relation with indicia on said indicator tape, another drive sprocket for adjustably positioning said other tape, a second reversible motor means, operator-operative means to selectively control the direction of rotation of said second motor means, differential drive means for jointly connecting said first and second mentioned motor means to said other drive sprocket, said second motor means being controlled by said operator-operative means so as to adjustably position through said differential drive means the other tape and thereby the command marker relative to the indicia on said indicator tape, the first mentioned motor means being controlled by said condition responsive means so as to adjustably position through said differential drive means the other tape and thereby the command marker in synchronism with the adjustment of the indicator tape effected through operation of the first mentioned drive sprocket by said first mentioned motor means, a command counter, means operatively connecting said second motor means to said command counter, said last mentioned connecting means including shaft lock means to prevent said first mentioned motor means from driving said counter therethrough while drivingly coupling said second motor means to said counter through said last mentioned connecting means, said last mentioned connecting means including another differential drive means operatively connected between said shaft lock means and said counter, cam correction means adjustably positioned by said second motor means through said shaft lock means, cam follower means adjustably positioned by said cam correction means and operatively connected to said other differential drive means to effectively adjust said counter so as to compensate the counter for nonlinearity in the calibration of the indicator tape, and an intermittent motion storage mechanism operatively connected between the first mentioned differential drive means and said other drive sprocket to limit the positioning of the other tape and thereby the command marker relative to the indicia on said indicator tape to within a predetermined limited range.

11. The improvement defined by claim 10 in which said independent friction drive means includes a pair of output pulleys driven by said unidirectional drive, a first input pulley drivingly connected to the first storage spool, a second input pulley drivingly connected to the second storage spool, an elastic spring coupling band drivingly connecting one of the output pulleys to the first input pulley, another elastic spring coupling band drivingly connecting the other output pulley to the second input pulley, said elastic spring coupling bands being arranged to effectively slip upon the tension applied therethrough exceeding a maximum value so as to maintain the tension applied to the indicator tape within a predetermined range during the positioning of the indicator tape by the first mentioned drive sprocket, and one of the spring coupling bands tending to slip to a greater extent than the other of said spring coupling bands dependent upon the direction of drive of the first mentioned sprocket by the first mentioned motor means in the positioning of the indicator tape.

12. In a condition indicator control system of a type including a condition indicator tape, drive means for adjustably positioning the indicator tape, a first storage spool operatively connected to the tape at one side of the drive means, a second storage spool operatively connected to the tape at the opposite side of the drive means, reversible motor means operatively connected to said drive means, and means to selectively control the direction of rotation of said reversible motor means; the improvement comprising means operatively connecting said motor means to said first and second storage spools and effective upon rotation of said motor means to bias said storage spools in a direction tending to wind the storage tape simultaneously on both of said storage spools so as to maintain the indicator tape under tension, said connecting means including independent friction drive means for effecting a continuous driving connection between said motor means and each of said storage spools, said independent friction drive means being arranged to slip upon the tension applied therethrough to said storage spools exceeding a preset value, another tape, a command marker carried by said other tape and arranged in cooperative relation with indicia on said indicator tape, another drive means for adjustably positioning said other tape, a second reversible motor means, operator-operative means to selectively control the direction of rotation of said second motor means, and differential drive means for jointly connecting said first and second mentioned motor means to said other drive means.

13. In condition indicator control system of a type including a condition indicator tape, drive means for adjustably positioning the indicator tape, a first storage spool operatively connected to the tape at one side of the drive means, a second storage spool operatively connected to the tape at the opposite side of the drive means, reversible motor means operatively connected to said drive means, and means to selectively control the direction of rotation of said reversible motor means; the improvement comprising means operatively connecting said motor means to said first and second storage spools and effective upon rotation of said motor means to bias said storage spools in a direction tending to wind the storage tape simultaneously on both of said storage spools so as to maintain the indicator tape under tension, said connecting means including independent friction drive means for effecting a continuous driving connection between said motor means and each of said storage spools, said independent friction drive means being arranged to slip upon the tension applied therethrough to said storage spools exceeding a preset value, another tape, a command marker carried by said other tape and arranged in cooperative relation with indicia on said indicator tape, another drive means for adjustably positioning said other tape, a second reversible motor means, operator-operative means to selectively control the direction of rotation of said second motor means, differential drive means for jointly connecting said first and second mentioned motor means to said other drive means, said second motor means being controlled by said operator-operative means so as to adjustably position through said differential drive means the other tape and thereby the command marker relative to the indicia on said indicator tape, and the first mentioned motor means being controlled by said condition responsive means so as to adjustably position through said differential drive means the other tape and thereby the command marker in synchronism with the adjustment of the indicator tape effected through operation of the first mentioned drive means by said first mentioned motor means.

References Cited in the file of this patent
UNITED STATES PATENTS

| | | |
|---|---|---|
| 1,098,617 | Dawson | June 2, 1914 |
| 2,207,075 | Sperry | July 9, 1940 |
| 2,304,913 | Herzig | Dec. 15, 1942 |